US007684342B2

(12) United States Patent
Gupta et al.

(10) Patent No.: US 7,684,342 B2
(45) Date of Patent: Mar. 23, 2010

(54) MEDIA INDEPENDENT TRIGGER MODEL FOR MULTIPLE NETWORK TYPES

(75) Inventors: Vivek G Gupta, Portland, OR (US); David Johnston, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 1006 days.

(21) Appl. No.: 10/982,228

(22) Filed: Nov. 3, 2004

(65) Prior Publication Data

US 2006/0092864 A1     May 4, 2006

(51) Int. Cl.
*H04L 12/26* (2006.01)
(52) U.S. Cl. ........................ 370/252; 370/332
(58) Field of Classification Search ........... 370/252, 370/241, 242, 244, 328, 329, 331, 332, 333, 370/338
See application file for complete search history.

(56) References Cited

U.S. PATENT DOCUMENTS

| | | | |
|---|---|---|---|
| 5,884,147 A * | 3/1999 | Reudink et al. | 455/67.11 |
| 6,839,872 B2 | 1/2005 | Kohda | |
| 7,254,119 B2 * | 8/2007 | Jiang et al. | 370/328 |
| 2002/0114350 A1 | 8/2002 | Tang et al. | |
| 2004/0131078 A1 | 7/2004 | Gupta et al. | |
| 2004/0202197 A1 | 10/2004 | Gao et al. | |
| 2005/0010460 A1 * | 1/2005 | Mizoguchi et al. | 705/7 |
| 2006/0067238 A1 * | 3/2006 | Olsson et al. | 370/242 |
| 2007/0274268 A1 * | 11/2007 | Axelsson et al. | 370/338 |
| 2008/0037477 A1 * | 2/2008 | Axelsson et al. | 370/338 |

FOREIGN PATENT DOCUMENTS

| | | |
|---|---|---|
| EP | 1263166 A2 | 12/2002 |
| EP | 1698115 A1 | 9/2006 |
| TW | 517476 B | 1/2003 |
| WO | 2006/050518 A1 | 5/2006 |

OTHER PUBLICATIONS

U.S. Appl. No. 10/856,385, filed May 27, 2004, Gupta et al.
U.S. Appl. No. 10/856,404, filed May 27, 2004, Gupta et al.
Gupta et al—Mar. 1, 2004—IEEE A Generalized Model for Link Layer Triggers.
PCT/US2005/040138 International Search Report and Written Opinion Mailed Mar. 6, 2006.
"OSI model", Feb. 2008, 9 pages.
International Preliminary Report on Patentability for PCT Patent Application No. PCT/US2005/040138, mailed on May 18, 2007, 7 pages.

* cited by examiner

*Primary Examiner*—Brian D Nguyen
(74) *Attorney, Agent, or Firm*—Kacvinsky LLC

(57) ABSTRACT

A media independent trigger model for multiple network types is disclosed. A change in communication environment trigger is communicated from a media dependent interface to an upper media independent application. The communication environment trigger may be from a local event detected by the interface or may be a remote trigger received from another device. The upper media independent application adjusts operations according to the communication environment trigger.

39 Claims, 4 Drawing Sheets

MEDIA INDEPENDENT TRIGGER MODEL FOR MULTIPLE NETWORK TYPES

BACKGROUND

Description of the Related Art

In advancing communication technology, a single device may be able to communicate over two or more different kinds of wired or wireless links. Each of these links may implement a different link protocol, and distinct types of hardware and software may be used to support the various protocols. The networks formed by the different types of links may be heterogeneous networks, meaning that the hardware and software associated with one of the links might not be usable to make connections across another link. Some of the networks formed by the different types of links may be homogeneous links, but may have different access parameters, including operator or carrier differences, access point or base station differences, encoding differences, and the like.

As a mobile device roams from one location to another, properties of the communication networks in the environment change. For example, the strength of a wireless signal may decrease as the mobile device moves away from another device and eventually become too weak to communicate properly. Thus, the mobile device may need to switch communication links, for example, from a WiFi network to a WiMax network or from one access point to another access point.

Changes in the properties of communication networks or links, for example, a decrease in signal strength, an increase in noise, a decrease in throughput, and the like, are easily detected at media dependent layers such as a physical (PHY) layer and/or a media access control (MAC) layer. Higher layers, such as a transport layer and an application layer, are media independent and applications operating here typically can not detect changes in the properties of different communication networks or links. A higher layer application may notice lack of received packets and initiate a large timeout counter. Upon timeout, the unavailability of the current link is apparent and adaptive action is taken. A technique is needed to make applications at higher media independent layers quickly and accurately aware of changes in the communication environment.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DESCRIPTION OF THE EMBODIMENT(S)

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," and the like, indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," and the like, to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computing platform" may comprise one or more processors.

Types of communication systems intended to be within the scope of the present invention include, although not limited to, Local Area Network (LAN), Ethernet, Wireless Local Area Network (WLAN), Wireless Wide Area Network (WWAN), Wireless Personal Area Network (WPAN), Wireless Metropolitan Area Network (WMAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, Universal Mobile Telecommunications System (UMTS), and the like, although the scope of the invention is not limited in this respect.

Figure 1:
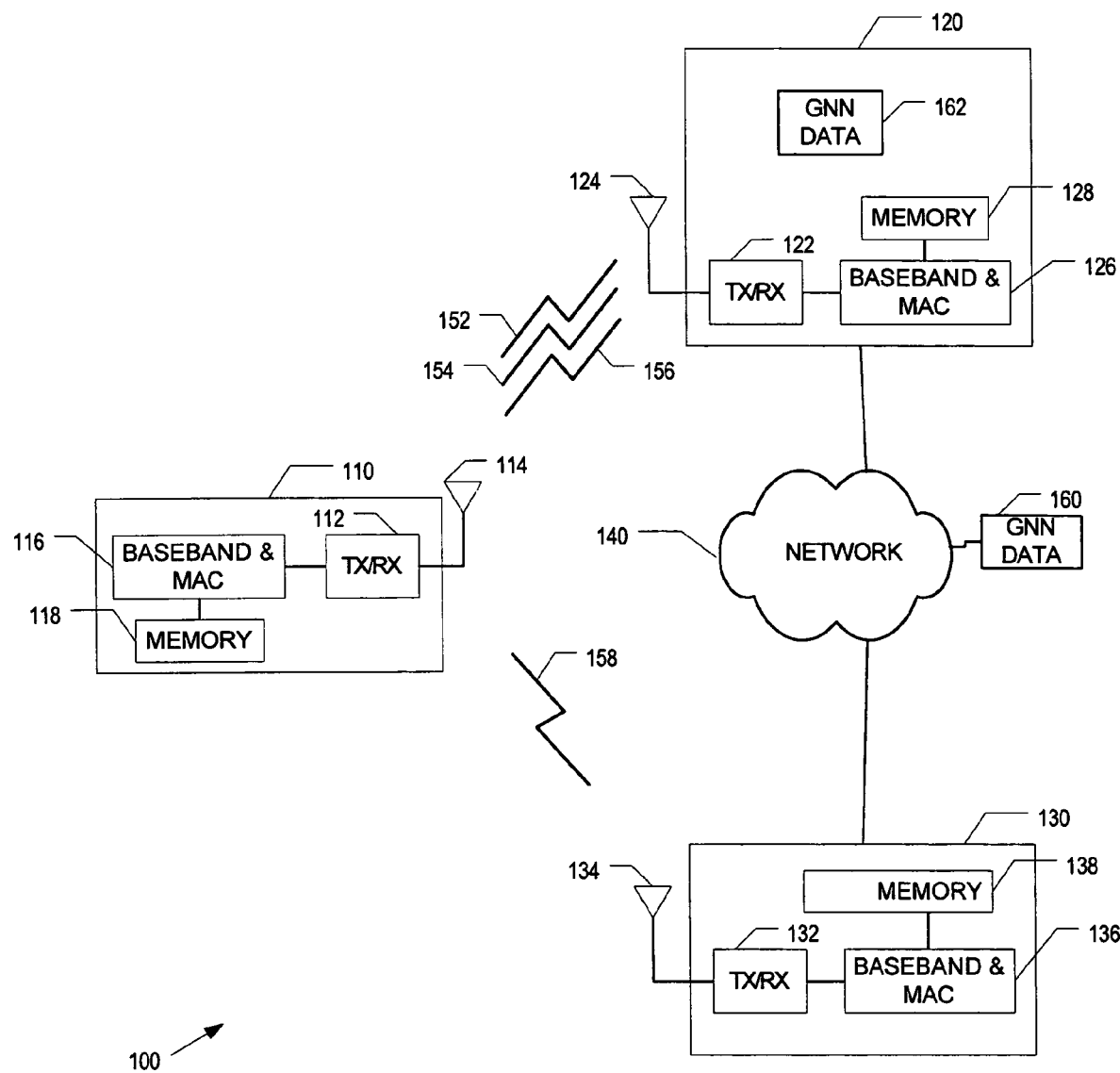
FIG. 1 illustrates a block diagram of a communication system with multiple wired and wireless networks according to an embodiment of the present invention.

FIG. 1 illustrates a block diagram of a communication system with multiple wired and wireless networks according to an embodiment of the present invention. In the system 100 shown in FIG. 1, a first device 110 may include a wireless transceiver 112 to couple to one or more antennas 114 and to a baseband processor 116. Baseband processor 116 in one embodiment may include a single processor, or alternatively may include a baseband processor and an applications processor, although the scope of the invention is not limited in this respect. Baseband processor 116 may couple to a memory 118 which may include volatile memory such as DRAM, non-volatile memory such as flash memory, or alternatively may include other types of storage such as a hard disk drive, although the scope of the invention is not limited in this respect. Some portion or all of memory 118 may be included on the same integrated circuit as baseband processor 116, or alternatively some portion or all of memory 118 may be disposed on an integrated circuit or other medium, for example a hard disk drive, that is external to the integrated circuit of baseband processor 116, although the scope of the invention is not limited in this respect.

First device 110 communicates to a second device 120 and a third device 130, at least one of the three may be a mobile unit (MU). Second device 120 may include a transceiver 122, one or more antennas 124, baseband processor 126, and memory 128. Third device 130 may include a transceiver 132, one or more antennas 134, baseband processor 136, and memory 138.

First device 110, second device 120, and third device 130 may be any of various devices, such as a cellular telephone, wireless telephone headset, printer, wireless keyboard, mouse, wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), portable or stationary personal computers (PCs), personal digital assistants (PDAs), software defined radios, reconfigurable radios, or other device capable of communicating over a wireless network. Additionally or alternatively, in other embodiments of the present invention, communication system 100 may include additional devices, any of which may be mobile units.

In some embodiments, first device 110, second device 120, and third device 130 may transmit and/or receive one or more packets over system 100 via antennas 114, 124, and 134. In addition, first device 110, second device 120, and third device 130 may include two or more antennas to provide a diversity antenna arrangement, to provide spatial division multiple access (SDMA), or to provide a multiple input, multiple output (MIMO) system, or the like, although the scope of the invention is not limited in this respect. The packets may include data, control messages, network information, and the like.

Second device 120 may be coupled with network 140 wired or wirelessly so that first device 110 and second device 120 may communicate with network 140, including devices coupled to network 140. Network 140 may include a public network such as a telephone network or the Internet, or alternatively network 140 may include a private network such as an intranet, or a combination of a public and a private network, although the scope of the invention is not limited in this respect. Third device 130 may also couple with network 140. Second device 120 and/or third device 130 may be network attachment points, for example, access points, base stations, and the like, though the invention is not limited in this respect. For example, second device 120 and/or third device 130 may be other wired or wireless devices with indirect network access.

First device 110 and second device 120 may communicate with each other via one of multiple wireless communication links, for example links 152, 154, and 156. First device 110 and third device 130 may communicate with each other via wireless communication link 158. Each of these links may implement a different wireless air link protocol, and distinct types of hardware and software may be used to support the various protocols. For example, transceiver 112 and antennas 114 may include multiple transceivers and antennas for communicating via the multiple wireless communication links. The choice of which communication link to use may be determined based on proximity to the other device, strength of a signal, available bandwidth, cost of wireless spectrum, user or system level policies, and other such conditions.

Note that first device 110 is illustrated as being capable of communicating according to three or more wireless networks, second device 120 is illustrated as being capable of communicating according to three wireless networks and a wired network (to network 140), and third device 130 is illustrated as being capable of communicating according to one wireless network and a wired network. Each device may be capable of communicating according to any number of wired or wireless networks, the invention is not limited in this scope.

Links 152, 154, 156, and 158 may be implemented in accordance with various wireless standards including, for example, one or more wireless cellular standards, one or more wireless networking standards, one or more radio frequency identification (RFID) standards, and/or others. Some of the different networks formed by links 152, 154, 156, and 158 may be heterogeneous networks, meaning that the hardware and software associated with one of the links cannot typically be used to make connections across another link. In at least one implementation, for example, at least one link is implemented in accordance with the Bluetooth short range wireless protocol (Specification of the Bluetooth System, Version 1.2, Bluetooth SIG, Inc., November 2003, and related specifications and protocols). Other possible wireless networking standards include, for example: IEEE 802.3, IEEE 802.11 (ANSI/IEEE Std 802.11-1999 Edition and related standards), IEEE 802.16, HIPERLAN 1, 2 and related standards developed by the European Telecommunications Standards Institute (ETSI) Broadband Radio Access Networks (BRAN), HomeRF (HomeRF Specification, Revision 2.01, The HomeRF Technical Committee, July, 2002 and related specifications), and/or others. Some of the different networks formed by links 152, 154, 156, and 158 may be homogeneous links, but may have different access parameters, including operator or carrier differences, access point or base station differences, encoding differences, and the like. For example, networks formed by links 156 and 158 may be IEEE 802.11 networks but have different access parameters, for example, as two different access points and/or two different operators/carriers.

In one embodiment of the present invention, first device 110 communicates with second device 120 via wireless link 152. If the communication environment changes, for example, if first device 110 is a mobile device and begins moving out of a range capable of communicating via link 152, first device 110 may begin communicating, for example, with second device 120 via link 154 or with third device 130 via link 158. In an alternate embodiment of the present invention, second device 120 may disconnect a wired connection to network 140 and need to begin communicating wirelessly. In each of these situations, the change in the interface environment needs to be communicated to upper media independent applications such that appropriate action can be taken. A media independent trigger is generated at a media dependent layer and communicated to upper media independent application levels.

Upper media independent applications may use the trigger information to determine a new optimum communication link. Other applications may use the trigger information to adjust communication parameters, for example, by adjusting the size of packets sent and the communication frequency, or by ceasing communication during a link handover.

A generalized trigger model provides abstraction for communication environment events. Communication environment events are communicated to upper layer applications as a trigger in a common format across different types of networks. Thus, media independent applications are able to interface with lower layer media dependent functions (MAC and PHY) in a consistent manner across multiple different media types.

Trigger events may be deterministic or predictive. Deterministic trigger events may indicate current link status such as link up or link down. Link up status communicates, for example, that the physical link is connected at the media dependent layer and that media independent applications can begin communications. Link down status communicates, for example, that the physical link is down at the media dependent layer and that the media independent layer should cease communications. A deterministic trigger event may also indicate current status of another link. For example, a management trigger indicating that another link is available may be sent from the network, for example, an access point. The other link, to for example, another access point, may be more optimal than the link currently used by a device. Predictive trigger events may indicate a future, predicted link status such as link going down or link going up. Link going down status indicates, for example, that based on decaying signal strength and the like, a loss of link connectivity is expected in a certain amount of time. Link going up status indicates, for example, that the physical layer connectivity is expected to be available in a certain amount of time. Although four trigger events are described, other trigger events may also be generated, for example, link available and other such events. The invention is not limited in this respect.

Figure 2:
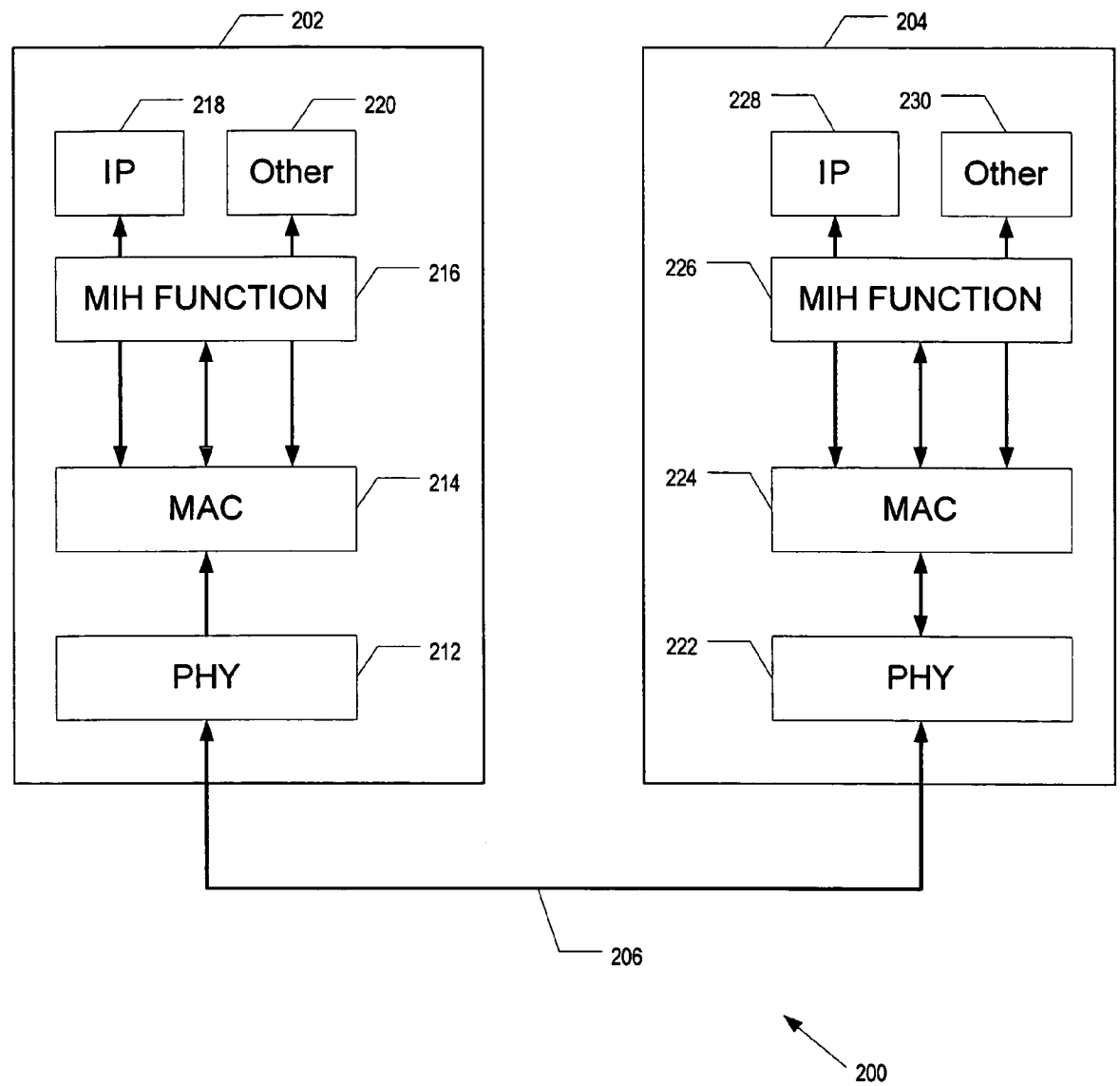
FIG. 2 illustrates a network independent trigger model according to an embodiment of the present invention.

FIG. 2 illustrates a network media independent trigger model 200 according to an embodiment of the present invention. A first device 202 communicates with a second device 204 via a communication link 206. Communication link 206 may be a wired or a wireless link. First device 202 includes a physical (PHY) layer 212, a media access control (MAC) layer 214, a media independent handover function 216, an Internet protocol (IP) application 218 and one or more other applications, 220. Second device 204 includes similar, but not necessarily the same layers, a physical (PHY) layer 222, a media access control (MAC) layer 224, a media independent handover function 226, an Internet protocol (IP) application 228 and one or more other applications, 230. PHY layers 212 and 222 and MAC layers 214 and 224 are considered media dependent layers because these layers implement the communication or network specific media interface and are different for different communication media. For example, a WiMax media interface operates according to different parameters and protocols than a WLAN media interface and the associated PHY and MAC layers are different. Layers above PHY and MAC layers are considered media independent layers because the applications that operate at these levels are independent of the type of communication media.

In one embodiment of the present invention, PHY layer 212 and/or MAC layer 214 of first device 202 detect a change in environment on link 206. PHY layer 212 and/or MAC layer 214 generate a media independent trigger. The trigger is media independent such that PHY or MAC layers associated with different communication media generate a similarly formatted trigger. The trigger is sent to applications in upper layers, for example, MIH function 216, IP application 218, and/or other applications 220. These applications at upper layers adjust their operations accordingly. For example, MIH function 216 may determine a new link for communication, IP application 218 may cease communications for a period of time, and the like.

In another embodiment of the present invention, a remote trigger is generated by second device 204. This trigger may be generated by one of the media independent applications or by MAC layer 224 or PHY layer 222. The remote trigger is packaged and sent to first device 202 via link 206. PHY layer 212 and/or MAC layer 214 receives the remote trigger and sends it to the upper media independent applications of first device 202.

The trigger is media independent allowing higher layer applications to receive trigger events in a consistent manner across different communication media. Thus higher layer applications need to support a single trigger/event interface for all communication media.

Figure 3:
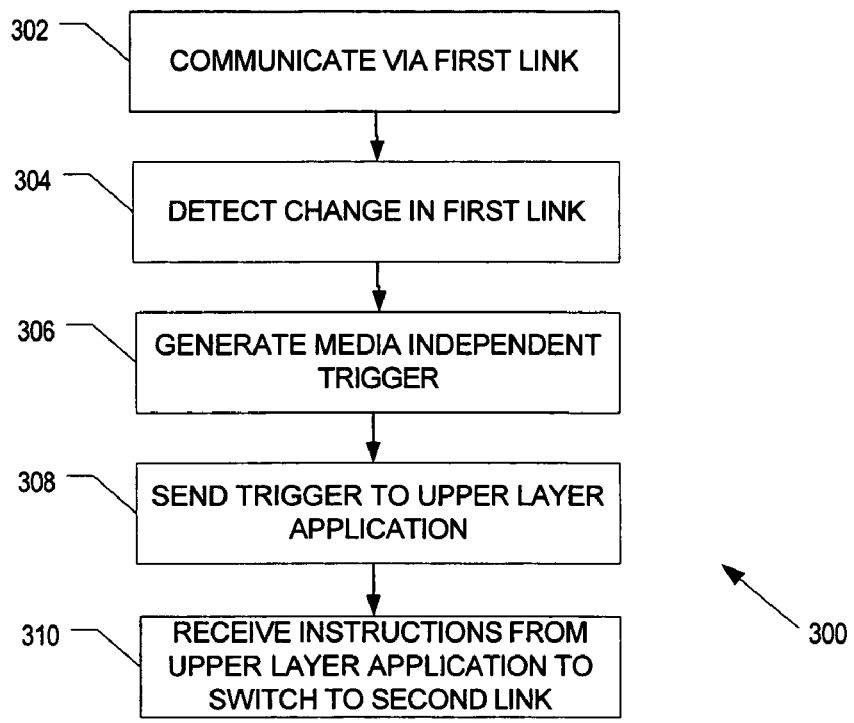
FIG. 3 illustrates a flow diagram performed by a media dependent interface of a device according to an embodiment of the present invention.

FIG. 3 illustrates a flow diagram 300 performed by a media dependent interface of a device according to an embodiment of the present invention. A device communicates with another device via a first link during normal operation, block 302. A media dependent interface detects a change in the interface environment of the first link, for example, a change in signal strength, a decrease in data throughput, an increase in noise, and the like, block 304. The media dependent interface generates a media independent trigger, block 306 and sends the trigger to an upper media independent application, block 308. The media dependent interface receives instructions from the upper layer application, for example, to switch to a second link with the other device or a second link with a different device, block 310.

In an alternate embodiment of the present invention, instructions are not received from an upper layer application and the media dependent interface automatically switches links. The upper layer applications receiving a trigger adjust operations as needed.

Figure 4:
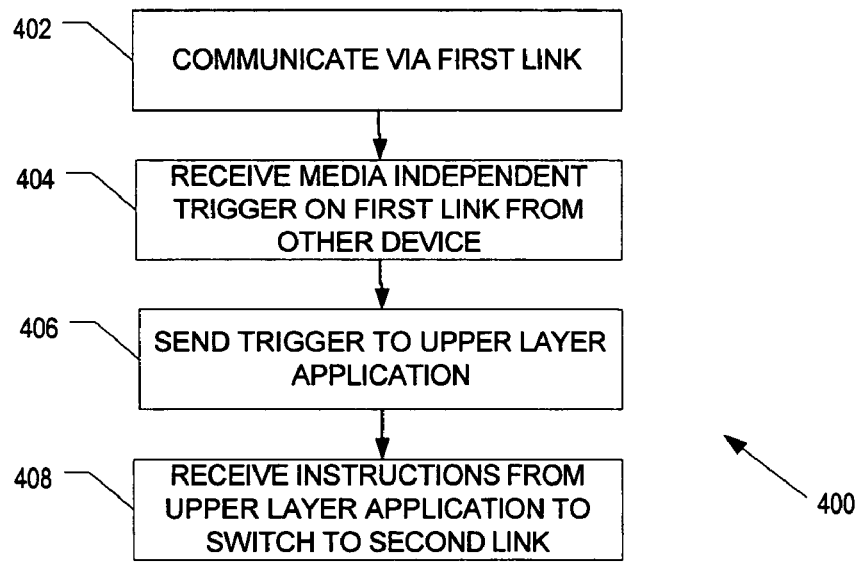
FIG. 4 illustrates another flow diagram performed by a media dependent interface of a device according to an embodiment of the present invention.

FIG. 4 illustrates a flow diagram 400 performed by a media dependent interface of a device according to an embodiment of the present invention. A device communicates with another device via a first link during normal operation, block 402. The other device may be a mobile device, a network entity such as an assess point or a base station, and the like. A media dependent interface receives a media independent trigger on the first link from the other device, block 404. The media dependent interface sends the remote trigger to an upper layer media independent application, block 406. The media dependent interface receives instructions from the media independent application to affect a change to the first link, for example, to switch to a second link, block 408.

Figure 5:
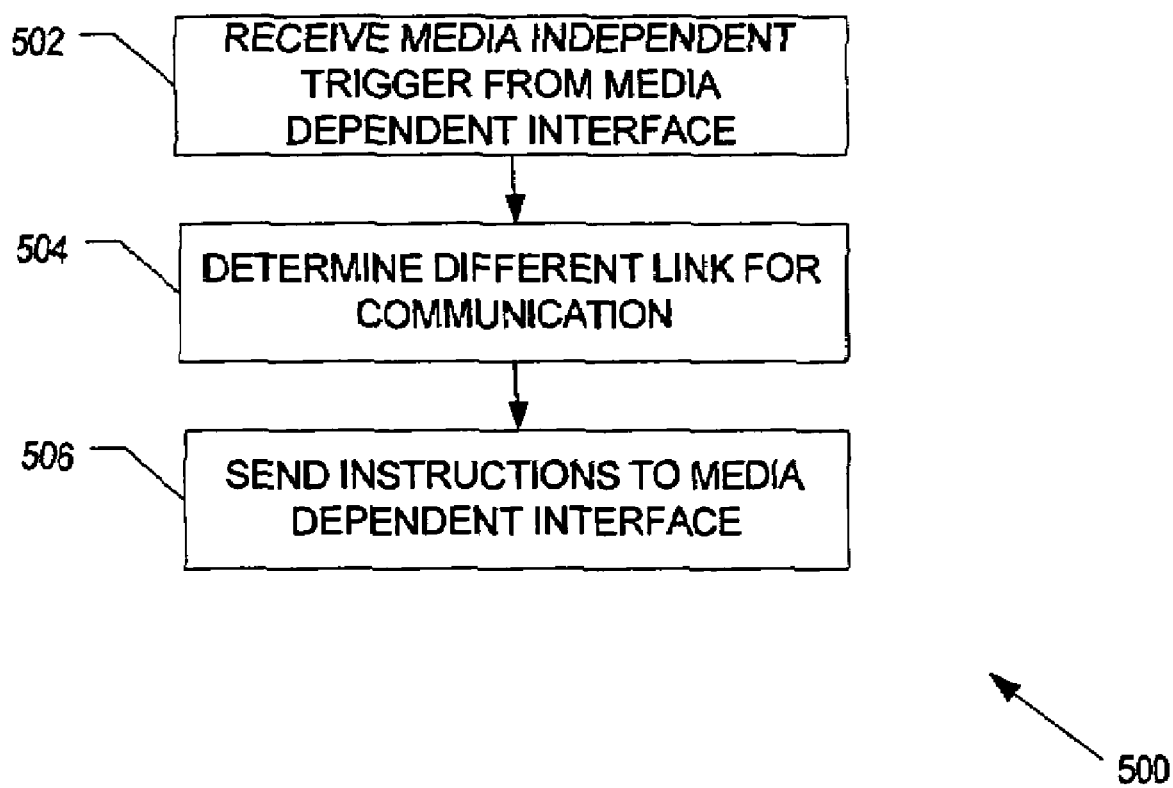
FIG. 5 illustrates a flow diagram performed by a media independent application of a device according to an embodiment of the present invention.

FIG. 5 illustrates a flow diagram 500 performed by a media independent application of a device according to an embodiment of the present invention. A media independent application receives a media independent trigger indicating a change in interface environment from a lower media dependent interface, block 502. The media independent application determines a different link for communication, block 504. In this determination, the media independent application may determine whether the link was locally or remotely generated, the type of trigger, and determine a best available link. The media independent application sends instructions to the lower layer media dependent interface to affect a change in the communication link, block 506.

The techniques described above may be embodied in a computer-readable medium for configuring a computing system to execute the method. The computer readable media may be permanently, in a removable manner, or remotely coupled to first device 110, second device 120, third device 130 or another system. The computer readable media may include, for example and without limitation, any number of the following: magnetic storage media including disk and tape storage media; optical storage media such as compact disk media (for example, CD-ROM, CD-R, and the like) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, and the like; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (I/O) devices. A computing system processes information according to a program and produces resultant output information via I/O devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. An apparatus comprising:
   a media independent application at an application layer;
   an interface to communicate an interface environment change with a first device and with the media independent application;
   the interface further to communicate an interface environment change trigger to the media independent application in response to the interface environment change; and
   the media independent application further to receive the interface environment change trigger and to adjust operations based on the interface environment change trigger;
   wherein the interface includes MAC and PHY layers.

2. The apparatus as recited in claim 1, wherein the interface environment change trigger is generated from a remote trigger event received from the first device.

3. The apparatus as recited in claim 1, wherein the interface environment change trigger is generated from a local event detected by the interface.

4. The apparatus as recited in claim 3, wherein the local event is a decrease in signal strength of a signal from the first device.

5. The apparatus as recited in claim 1, wherein the interface environment change trigger indicates a current status of a link between the interface and the first device.

6. The apparatus as recited in claim 5, wherein the current status of the link indicates that the link is up.

7. The apparatus as recited in claim 5, wherein the current status of the link indicates that the link is down.

8. The apparatus as recited in claim 1, wherein the interface environment change trigger indicates a future predictive status of a link between the interface and the first device.

9. The apparatus as recited in claim 8, wherein the future predictive status of the link indicates that the link is going up.

10. The apparatus as recited in claim 8, wherein the future predictive status of the link indicates that the link is going down.

11. The apparatus as recited in claim 1, wherein the interface communicates to the first device via a first link, wherein the interface environment change trigger indicates that a second link is available for communication.

12. The apparatus as recited in claim 1, wherein to adjust operations comprises to cause a change in communication from the first device to a second device.

13. The apparatus as recited in claim 1, wherein to adjust operations comprises to cause a change in communication from one network type to another network type.

14. The apparatus as recited in claim 1, wherein the interface is to communicate with the first device via a plurality of network types and the interface environment change trigger is to be received by the media independent application in the same format regardless of the network type.

15. A method comprising:
   receiving, by a wireless communication device a communication of an interface environment change from a first device via a first communication link;
   sending an interface environment change trigger from MAC and PHY layers to a media independent application at an application layer in response to the interface environment change and
   receiving, by the media independent application, the interface environment change trigger and to adjust operations based on the interface environment change trigger.

16. The method as recited in claim 15, further comprising:
   detecting an environment change event on the first communication link; and
   generating the interface environment change trigger.

17. The method as recited in claim 16, wherein the environment change event is a decrease in signal strength of a signal from the first device.

18. The method as recited in claim 15, further comprising receiving the interface environment change trigger from the first device.

19. The method as recited in claim 16, further comprising receiving instructions from the media independent application to change communication with the first device to a second communication link.

20. The method as recited in claim 15, further comprising receiving instructions from the media independent application to change communication to a second device.

21. The method as recited in claim 15, wherein the interface environment change trigger indicates a current status of the first communication link.

22. The method as recited in claim 15, wherein the interface environment change trigger indicates a future predictive status of the first communication link.

23. The method as recited in claim 15, wherein the interface environment change trigger indicates that a second communication link is available for communication.

24. An article comprising a computer-readable medium having stored thereon computer-executable instructions that, when executed by at least one processor, cause operations comprising:

receiving, by a wireless communication device, a communication of an interface environment change from a first device via a first communication link;

sending an interface environment change trigger from PHY and MAC layers to a media independent application at an application layer in response to the interface environment change and receiving, by the media independent application, the interface environment change trigger and to adjust operations based on the interface environment change trigger.

25. The article as recited in claim 24, the operations further comprise:

detecting an environment change event on the first communication link; and generating the interface environment change trigger.

26. The article as recited in claim 25, wherein the environment change event is a decrease in signal strength of a signal from the first device.

27. The article as recited in claim 24, wherein the operations further comprise receiving the interface environment change trigger from the first device.

28. The article as recited in claim 24, wherein the operations further comprise receiving instructions from the media independent application to change communication with the first device to a second communication link.

29. The article as recited in claim 24, wherein the operations further comprise receiving instructions from the media independent application to change communication to a second device.

30. The article as recited in claim 24, wherein the interface environment change trigger indicates a current status of the first communication link.

31. The article as recited in claim 24, wherein the interface environment change trigger indicates a future predictive status of the first communication link.

32. The article as recited in claim 24, wherein the interface environment change trigger indicates a second communication link is available for communication.

33. A system comprising:

one or more antennas;

a media independent application at an application layer;

an interface to communicate an interface environment change with a first device via the one or more antennas and with the media independent application;

the interface further to communicate an interface environment change trigger to the media independent application in response to the interface environment change; and the media independent application further to receive the interface environment change trigger and to adjust operations based on the interface environment change trigger;

wherein the interface includes MAC and PHY layers.

34. The system as recited in claim 33, wherein the interface environment change trigger is generated from a remote trigger event received from the first device.

35. The system as recited in claim 33, wherein the interface environment change trigger is generated from a local event detected by the interface.

36. The system as recited in claim 33, wherein the interface environment change trigger indicates a current status of a signal received on the one or more antennas from the first device.

37. The system as recited in claim 33, wherein the interface environment change trigger indicates a future predictive status of a signal received on the one or more antennas from the first device.

38. The system as recited in claim 33, wherein to adjust operations comprises to cause a change in communication from the first device to a second device.

39. The system as recited in claim 33, wherein to adjust operations comprises to cause a change in communication from one network type to another network type.

* * * * *